United States Patent

Matsuo et al.

[11] Patent Number: 5,283,266
[45] Date of Patent: Feb. 1, 1994

[54] MICROCAPSULE TYPE ADHESIVE

[75] Inventors: Satoshi Matsuo, Sagamihara; Ikuzo Usami, Tsukui; Makoto Kurihara, Akishima; Kunihiko Nakashima, Machida, all of Japan

[73] Assignee: Three Bond Co., Ltd., Tokyo, Japan

[21] Appl. No.: 980,484

[22] Filed: Nov. 23, 1992

[30] Foreign Application Priority Data

Nov. 22, 1991 [JP] Japan .................. 3-354207

[51] Int. Cl.$^5$ .............. C08K 9/10; C08G 59/50; C09J 9/00; C09J 11/08
[52] U.S. Cl. .................. 523/206; 523/207; 523/208; 525/59; 525/936
[58] Field of Search ......... 523/206, 207, 208; 525/936, 58, 59

[56] References Cited

U.S. PATENT DOCUMENTS

| 3,391,095 | 7/1968 | Tringali | 523/449 |
| 3,657,379 | 4/1972 | Hilbelink | 525/936 |
| 4,460,722 | 7/1984 | Igarashi | 523/206 |
| 4,760,108 | 7/1988 | Asano | 525/80 |

FOREIGN PATENT DOCUMENTS

| 45-11051 | 4/1970 | Japan . |
| 52-46339 | 11/1977 | Japan . |
| 53-11883 | 2/1978 | Japan . |
| 2-308876 | 12/1990 | Japan . |

OTHER PUBLICATIONS

Derwent, Inc., "Abstract # 78-20514A/11, of J53-11883", McLean, Va.

Primary Examiner—John C. Bleutge
Assistant Examiner—D. R. Wilson
Attorney, Agent, or Firm—Scully, Scott, Murphy & Presser

[57] ABSTRACT

A microcapsule adhesive for preventing the loosening of screws and the like, which is superior in storage stability, adhesive force and safety, and which is comprised of an epoxy resin as a core material; a urea-formaldehyde resin, a melamine-formaldehyde resin, a polyurethane or a urea-urethane resin as a wall material; a water-soluble polyacetal resin binder; and a nonvolatile, water-soluble or -dispersible amine-based curing agent.

2 Claims, No Drawings

MICROCAPSULE TYPE ADHESIVE

BACKGROUND OF THE INVENTION

The present invention relates to a microcapsule type adhesive to be applied to a threaded surface of a threaded member such as screw, bolt, nut, or the like, to prevent loosening or impart a close-contact property (both hereinafter referred to as "prevent loosening") thereto.

Heretofore, as a loosening preventing adhesive to be applied to a threaded surface (screw thread) of a threaded member such as screw, bolt, nut, or the like, there has been known a composition comprising a microcapsule containing a reactive adhesive and a resin as a binder, using an organic solvent or water as a solvent, for example in Japanese Patent Publication Nos. 11051/1970 and 46339/1977 and Japanese Patent Laid Open Nos. 308876/1990 and 11883/1978.

However, such known microcapsule type adhesives involve drawbacks poor adhesion, poor storage stability and likelihood of causing an environmental pollution. For example, if there is used as a binder an emulsion, e.g. acryl emulsion, or a dispersion type binder, the emulsifying or dispersion stability is impaired by a curing agent used, resulting in increase of viscosity and difficulty of application in many cases. And in the case where polyvinyl alcohol or gelatin film is used as a wall film, it is difficult to prevent the deterioration of its performance due to swelling caused by water for example. Moreover, the use of an acrylic resin as a reactive adhesive causes deterioration not only in bonding strength at high temperatures but also in solvent resistance. Further, many conventional microcapsule type adhesives employ organic solvents, but the use of organic solvents not only causes the problem of environmental pollution but also may badly affect the worker's health during application to screw, bolt, nut, or the like.

It is the object of the present invention to solve the above-mentioned problems of the prior art.

SUMMARY OF THE INVENTION

According to the present invention there is provided a microcapsule type adhesive for preventing the loosening of screw, bolt, nut, or the like, characterized by comprising (A) a microcapsule using a curable epoxy resin as a core material and an aldehyde resin or urea resin as a wall material, (B) a water-soluble polyacetal resin binder and (C) a non-volatile water-soluble or -dispersible amine-based curing agent.

As the curable epoxy resin which constitutes the core of the microcapsule in the present invention there is used a conventional water-insoluble epoxy resin having an epoxy group in the molecule. A preferred example is one having a viscosity of not higher than 100,000 mPa.s and which is easily encapsulated. As examples of such epoxy resin there are mentioned reaction products of polyhydric alcohol such as bisphenol A and epichlorohydrin, polyglycidyl ether and epichlorohydrin, phenolformaldehyde condensation polymer and epichlorohydrin, aminephenol and 1,2-epoxy resin.

As the wall material of the microcapsule in the invention there is used an aldehyde resin or a urea resin. As examples of the aldehyde resin are mentioned conventional ones such as urea-formaldehyde resin and melamine-formaldehyde resin. Examples of the urea resin include polyureas and polyurethanes. The wall film does not exhibit a swelling property for water and is impermeable to water.

It is the essence of the present invention to use a water-soluble polyacetal in combination with the microcapsule of the above construction.

A preferred example of such water-soluble polyacetal is one obtained by acetalizing a partial hydrolyzate of polyvinyl acetate with an aldehyde. Typical examples thereof are those represented by the following formula:

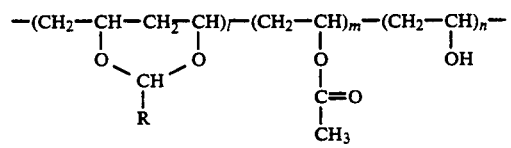

where $l=1\sim15$, $m+n=85\sim99$, and R is an alkyl group having 1 to 4 carbon atoms.

As to the curing agent used in the invention, it is necessary to select one which can cure the epoxy resin contained in the microcapsule quickly at room temperature collapse of the microcapsule and contact of the curing agent with the epoxy resin therein and which does not volaltilize in an applied state to a screw or the like. As the curing agent, a water-soluble or -dispersible amine-based curing agent which is non-volatile at room temperature, is used in the present invention.

As examples of the curing agent are mentioned amines in a narrow sense such as imidazole, 1,3-bis-4-piperidylpropane, 1,6-hexadiamine, methylenedianiline, substituted alkylenediamine, and liquid polyamides, e.g. Versamid 125 (a dimerized saturated aliphatic acid reacted with alkylenediamine), as well as amine adducts such as non-volatile solid amine salts prepared by the reaction of volatile liquid amines and acids, and water-soluble polyamide resins.

The ingredients of the microcapsule type adhesive of the present invention are preferably in the proportions of 10–60 parts by weight of the microcapsule, 5–35 parts by weight of the binder, 5–30 parts by weight of the curing agent and 10–80 parts of water.

In the state of a liquid composition before application of the microcapsule type adhesive of the present invention, changes in quality such as swelling of the capsule and curing the internal adhesive ingredients through the capsule are suppressed and thus the adhesive possesses a superior storage stability. Besides, the combination of the capsule with the water-soluble polyacetal resin binder permits the capsule to be fixed to a threaded surface efficiently with an excellent adhesive force. Moreover, a high bonding strength in a hot condition and a high bonding force in a normal state can be attained by a synergistic effect of those ingredients and the epoxy resin and amine-based curing agent. Since the use of an organic solvent is not required in the present invention, there is further attained an advantage that there is no fear of environmental pollution or bad influence on the worker's health.

EXAMPLES

Adhesive compositions were prepared in such compositions as shown in Tables 1 and 3 below, then each applied to a bolt (diameter: $M=10$ mm) and air-dried to prepare test pieces.

Torque Test: The test pieces were tightened at 300 kg.f.cm, then allowed to stand for 3, 5, 10, 24 and 48 hours, and thereafter untightening torques were measured.

Storage Stability Test: The adhesive compositions were subjected to a storage promotion test at 40° C. for 30 days. After tightening in the same manner as in the above torque test, the test pieces with the thus-stored adhesive compositions were allowed to stand for 24 hours, and thereafter untightening torque were measured.

The water-soluble polyacetal used had each been prepared by partially acetalizing a partial hydrolyzate of vinyl acetate with aldehyde. (In the following tables, the numeral of R represents the number of carbon atom.). the results obtained are as set forth in Table 2 and 4.

TABLE 1

|  | Ex. 1 | Com. Ex. 1 | Com. Ex. 2 | Com. Ex. 3 |
|---|---|---|---|---|
| Epoxy capsule (Wall film: urea-formalin) | 20 | 20 | 20 | |
| Epoxy capsule (wall film: gelatin) | | | | 20 |
| Water-soluble polyacetal (l = 5, m = 15, n = 80, R = 4) | 3 | | | 3 |
| Acryl emulsion | | 3 | | |
| Polyvinyl alcohol | | | 3 | |
| Silica powder | 5 | 5 | 5 | 5 |
| Pure water | 8 | 8 | 8 | 8 |
| 1,3-Dipiperidylpropane | 14 | 14 | 14 | 14 |

(Part by weight)

TABLE 2

| Item | Torque (kg.f.cm) | | | |
|---|---|---|---|---|
| | Ex. 1 | Com. Ex. 1 | Com. Ex. 2 | Com. Ex. 3 |
| Torque Test | | | | |
| after 3 hrs | 220 | — | — | — |
| after 5 hrs | 280 | — | — | — |
| after 10 hrs | 350 | — | — | — |
| after 24 hrs | 495 | 390 | — | 546 |
| after 48 hrs | 540 | 385 | — | 550 |
| Storage Stability Test | | | | |
| after 24 hrs | 480 | 370 | — | — |
| Remarks | | 1* | 2* | 3* |

1* Tightening caused drop-out of capsule.
2* Viscosity increased to an unapplicable extent during mixing.
3* Composition increased in viscosity in 3 to 4 hours.

TABLE 3

| | Ex. 2 | Ex. 3 | Ex. 4 | Ex. 5 |
|---|---|---|---|---|
| Epoxy capsule (wall film: urea-urethane) | 10 | 5 | 6 | |
| Epoxy capsule (wall film: polyurethane) | | | | 10 |
| Water-soluble polyacetal (l = 10, m = 10, n = 80, R = 2) | | 5 | | |
| Water-soluble polyacetal (l = 15, m = 3, n = 82, R = 1) | | 15 | 1 | 5 |
| Silica powder | 3 | | | 3 |
| Pure water | 25 | 26 | 40 | 25 |
| 1,3-Dipiperidylpropane | 7 | 4 | | |
| Water-soluble amine (H-23, a product of ACR, Co.) | | | 3 | |
| Water-soluble amine (H-4121, a product of ACR, Co.) | | | | 7 |

TABLE 4

| Item | Torque (kg.f.cm) | | | |
|---|---|---|---|---|
| | Ex. 2 | Ex. 3 | Ex. 4 | Ex. 5 |
| Torque Test | | | | |
| after 3 hrs | 440 | 215 | 200 | 410 |
| after 5 hrs | 450 | 290 | 220 | 460 |
| after 10 hrs | 550 | 320 | 220 | 460 |
| after 24 hrs | 640 | 320 | 240 | 500 |
| after 48 hrs | 600 | 335 | 300 | 600 |
| Storage Stability Test | 640 | 290 | 200 | 600 |

What is claimed is:

1. A microcapsule adhesive for preventing the loosening of a threaded member, comprising:
    (a) a microcapsule comprising a wall material and an epoxy resin as a core material, wherein the wall material is a urea-formaldehyde resin, a melamine-formaldehyde resin, a polyurethane or a urea-urethane resin and the epoxy resin has a viscosity of no more than 100,000 mPa;
    (b) a water-soluble polyacetal resin binder; and
    (c) a non-volatile, water-soluble or -dispersible amine-based curing agent
    wherein said water-soluble polyacetal resin is represented by the following formula:

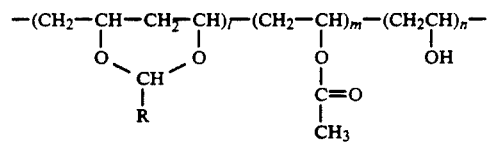

where $l = 1-15$, $m+n = 85-95$, $m = 3-15$, and R is an alkyl group having 1 to 4 carbon atoms.

2. The microcapsule adhesive of claim 1 wherein the microcapsule, the binder, the curing agent and water are present in proportions (weight ratio) of 10–60 parts, 5–35 parts, 5–30 parts and 10–80 parts, respectively.

* * * * *